United States Patent
Zhang et al.

(10) Patent No.: US 12,337,299 B2
(45) Date of Patent: Jun. 24, 2025

(54) USE OF NATURAL ATTAPULGITE AS NATURAL NANO MINERAL ENZYME

(71) Applicant: China University of Geosciences (Beijing), Beijing (CN)

(72) Inventors: Yihe Zhang, Beijing (CN); Minmin Liang, Beijing (CN); Feng Feng, Beijing (CN); Peixia Wang, Beijing (CN); Wangshu Tong, Beijing (CN); Qi An, Beijing (CN)

(73) Assignee: China University of Geosciences (Beijing), Beijing (CN)

(*) Notice: Subject to any disclaimer, the term of this patent is extended or adjusted under 35 U.S.C. 154(b) by 319 days.

(21) Appl. No.: 17/608,333

(22) PCT Filed: Jan. 15, 2021

(86) PCT No.: PCT/CN2021/072169
§ 371 (c)(1),
(2) Date: Nov. 2, 2021

(87) PCT Pub. No.: WO2021/143849
PCT Pub. Date: Jul. 22, 2021

(65) Prior Publication Data
US 2022/0339604 A1    Oct. 27, 2022

(30) Foreign Application Priority Data
Jan. 16, 2020    (CN) .......................... 202010046314.0

(51) Int. Cl.
*B01J 21/16*    (2006.01)
*B01J 35/27*    (2024.01)
(Continued)

(52) U.S. Cl.
CPC ............... *B01J 21/16* (2013.01); *B01J 35/27* (2024.01); *B01J 37/0036* (2013.01); *B01J 37/343* (2013.01); *C01B 13/0207* (2013.01)

(58) Field of Classification Search
CPC ........ B01J 21/16; B01J 35/27; B01J 37/0036; B01J 37/343; B01J 23/8892; B01J 35/615;
(Continued)

(56) References Cited

FOREIGN PATENT DOCUMENTS

CN    101579355        11/2009
CN    102147389 A  *  8/2011
(Continued)

OTHER PUBLICATIONS

Machine translation of CN102147389A (Year: 2011).*
International Search Report for Application No. PCT/CN2021/072169 dated Apr. 19, 2021.

*Primary Examiner* — Sally A Merkling
*Assistant Examiner* — Logan Edward Laclair
(74) *Attorney, Agent, or Firm* — Nields, Lemack & Frame, LLC

(57) ABSTRACT

A method for using a natural attapulgite is disclosed. The method includes using the natural attapulgite as a natural nano mineral enzyme. The results of the examples show that the natural attapulgite has peroxidase-like activity, catalase-like activity or superoxide dismutase-like activity, and good biocompatibility. Compared with protease, the natural attapulgite has the advantages such as large reserves, easy to obtain, low cost, high temperature resistance and wide range of pH value. Compared with a developed artificial nano enzymes, the natural attapulgite further has the advantages such as multi-function, natural non-toxic (from nature, no heavy metals), good biocompatibility, easy to obtain, no
(Continued)

complex processing, and huge surface area which provides a place for cell growth and proliferation.

5 Claims, 4 Drawing Sheets

(51) Int. Cl.
*B01J 37/00* (2006.01)
*B01J 37/34* (2006.01)
*C01B 13/02* (2006.01)

(58) Field of Classification Search
CPC .... C01B 13/0207; A61K 33/06; A61K 33/32; A61P 39/06
See application file for complete search history.

(56) References Cited

FOREIGN PATENT DOCUMENTS

| | | |
|---|---|---|
| CN | 108445142 | 8/2018 |
| CN | 109046360 | 12/2018 |
| CN | 110568033 | 12/2019 |
| CN | 111250072 | 6/2020 |
| WO | 2019182549 | 9/2019 |

* cited by examiner

USE OF NATURAL ATTAPULGITE AS NATURAL NANO MINERAL ENZYME

CROSS-REFERENCE TO RELATED APPLICATIONS

The present application claims the benefit and priority of Chinese Patent Application No. 202010046314.0, filed on Jan. 16, 2020, the present disclosure of which is incorporated by reference herein in its entirety as part of the present application.

TECHNICAL FIELD

The present disclosure relates to the technical field of enzyme catalysis, and more specifically, relates to use of a natural attapulgite as a natural nano mineral enzyme.

BACKGROUND ART

With the rapid development of medical technology, the demand for biomaterials with better performance is also increasing. Catalytic materials, especially enzymes, have been extensively studied because they play an important role in the regulation of human physiological activity. However, the practical use of natural enzymes is limited because they are difficult to extract and expensive. Although enzyme is small in size, it has powerful functions. Enzyme could promote most of the reactions that take place in the life system. Nevertheless, the use of enzyme is greatly limited due to its disadvantages such as high cost, poor stability and difficult extraction. With the increase of demand for enzymes, finding a natural non-toxic, catalytic effective and low-cost enzyme has become the top importance of scientific research. At present, some scholars have made some achievements in the research of artificial nano enzyme, such as magnetic nano enzyme, which is pioneered in the field of artificial enzyme.

Natural attapulgite has been widely studied and used in many fields such as materials science, catalysis and biomedicine due to its unique nanostructure. In terms of the catalysis, attapulgite is used as a catalyst carrier because of its large specific surface area and strong adsorption capacity.

SUMMARY

An object of the present disclosure is to provide use of a natural attapulgite as a natural nano mineral enzyme.

In order to achieve the above object, the present disclosure provides the following technical scheme:

The present disclosure provides use of a natural attapulgite as a natural nano mineral enzyme.

In some embodiments, the natural attapulgite has peroxidase-like activity, catalase-like activity or superoxide dismutase-like activity.

In some embodiments, the natural attapulgite is used in the form of a natural attapulgite dispersion, and an effective concentration of the natural attapulgite dispersion is not less than 1 mg/mL.

In some embodiments, the natural attapulgite dispersion is prepared by a method comprising:

subjecting the natural attapulgite to a grinding treatment, to obtain a powder, mixing the powder with water, to obtain a mixture, and subjecting the mixture to an ultrasonic treatment, to obtain the natural attapulgite dispersion.

In some embodiments, the grinding treatment is performed for 20-180 min, and the grinding treatment is performed at a rotation speed of 20-100 r/min.

In some embodiments, the ultrasonic treatment is performed for 20-180 min, and the ultrasonic treatment is performed with an ultrasonic power of 40 kHz.

In some embodiments, under the condition that the natural attapulgite has peroxidase-like activity or catalase-like activity, the natural attapulgite is used for enzyme catalysis by a process comprising:

mixing the natural attapulgite dispersion, a hydrogen peroxide solution, a substrate solution and a buffer solution, and subjecting the resulting mixture to the enzyme catalysis.

In some embodiments, the buffer solution is HAc—NaAc or PB buffer solution, and has a pH value of 2-10.

In some embodiments, under the condition that the natural attapulgite has superoxide dismutase-like activity, the natural attapulgite is used for enzyme catalysis by a process which is performed in accordance with a method of SOD kit.

The present disclosure provides use of a natural attapulgite as a natural nano mineral enzyme. The results of the examples show that the natural attapulgite has peroxidase-like activity, catalase-like activity or superoxide dismutase-like activity, and good biocompatibility, indicating that the natural attapulgite has the catalytic activity of natural protease. Compared with protease, the natural attapulgite has the advantages such as large reserves, easy to obtain, low cost, high temperature resistance and a wide range of pH value. Compared with a developed artificial nano enzymes, the natural attapulgite further has the advantages such as multi-function, natural non-toxic (from nature, no heavy metals), good biocompatibility, easy to obtain, no complex processing, and huge surface area (which provides a place for cell growth and proliferation). Therefore, the discovery of the natural attapulgite enzyme activity and the advantages such as huge reserves and natural non-toxic thereof would provide a foundation for the development of more functional applications in the fields of biomedicine, industrial catalysis, and environmental governance. The natural attapulgite could become a new generation of natural enzyme, even a multifunctional enzyme, being of great significance to life and health.

DETAILED DESCRIPTION OF THE EMBODIMENTS

Figure 1:
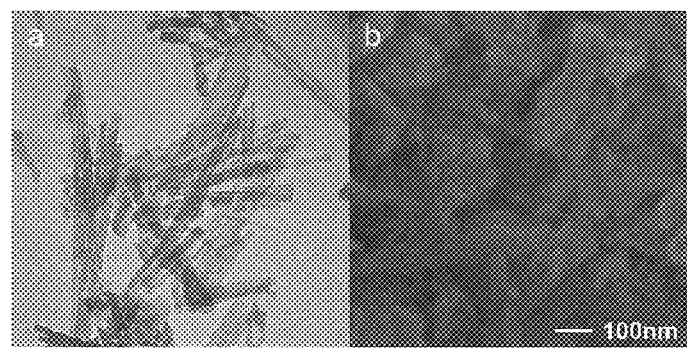
FIG. 1 shows the transmission electron microscope image and the scanning electron microscope image of the natural attapulgite in Example 1.

Use of a natural attapulgite as a natural nano mineral enzyme provided by the present disclosure will be illustrated in detail below with reference to the embodiments. It should be understood that they are not regarded as limiting the protection scope of the present disclosure.

The present disclosure provides use of a natural attapulgite as a natural nano mineral enzyme.

In the present disclosure, unless otherwise specified, the required raw materials or kits are commercially available products known to those skilled in the art.

In the present disclosure, the natural attapulgite is a one-dimensional fibrous hydrated magnesium aluminosilicate clay mineral. The natural attapulgite has such a basic structure that it includes two layers of silicon oxygen tetrahedron and one layer of octahedral metal cation, and has an unique layer chain like structure characteristics, i.e. needle-like, fibrous or fibrous aggregate crystal. In the present disclosure, the natural attapulgite has a large surface area and pore volume, strong adsorption, good thermal stability and excellent exchange ability of $H^+$, $Na^+$ and $K^+$.

In the present disclosure, the oxide content of the natural attapulgite is shown in Table 1:

TABLE 1

| The oxide content of the natural attapulgite | | | | |
|---|---|---|---|---|
| Component | $SiO_2$ | $Al_2O_3$ | $Fe_2O_3$ | $Na_2O$ | $K_2O$ |
| Content | 55.6-60.5 | 9.0-10.1 | 5.7-6.7 | 0.03-0.11 | 0.96-1.30 |
| Component | CaO | MgO | MnO | $TiO_2$ | Loss on Ignition |
| Content | 0.42-1.95 | 10.7-11.35 | 0.61 | 0.32-0.63 | 10.53-11.30 |

In the present disclosure, the trace elements in the natural attapulgite are subjected to a spectral analysis by conventional method, and the analysis results are shown in Table 2, expressed in Y/kg:

TABLE 2

| Spectral analysis results of the trace elements in the natural attapulgite | | | | | | | | | |
|---|---|---|---|---|---|---|---|---|---|
| Element | Cu | Pb | Zn | Cr | No | Bi | W | Sn | Ca | Ge |
| Content | 35-50 | ≤10 | 40-60 | 30-60 | <1 | <10 | <30 | <10 | <5 | <5 |
| Element | Ag | V | Co | Cd | As | Be | Sb | Ni | Ti | Mn |
| Content | <0.5 | 60-100 | <10 | <30 | <100 | <1 | <30 | 20-30 | 2500-3500 | 400-700 |

In the present disclosure, the natural attapulgite has a huge specific surface area (129.415 $m^2/g$), and contains metal elements such as Fe, which is the basis of enzyme activity.

In some embodiments of the present disclosure, the natural attapulgite used is purchased from Yuanheng Water Purification Material Factory, Gongyi City, Henan Province, China.

In some embodiments of the present disclosure, the natural attapulgite is used in the form of a dispersion, and the effective concentration of the natural attapulgite dispersion is not less than 1 mg/mL. In the embodiments of the present disclosure, in order to facilitate the determination of the enzyme activity of the natural attapulgite, the concentration of the natural attapulgite dispersion is preferably 1-5 mg/mL, and more preferably 1.5-3.5 mg/mL.

In the present disclosure, a method for preparing the natural attapulgite dispersion comprises: subjecting the natural attapulgite to a grinding treatment, to obtain a powder, mixing the powder with water, to obtain a mixture, and subjecting the mixture to an ultrasonic treatment, to obtain the natural attapulgite dispersion. In some embodiments of the present disclosure, the grinding treatment is performed for 20-180 min, and more preferably 50-150 min, and the grinding treatment is preferably performed at a rotation speed of 20-100 r/min, and more preferably 50-80 r/min. In some embodiments of the present disclosure, the ultrasonic treatment is performed for 20-180 min, and more preferably 50-150 min, and the ultrasonic treatment is performed with an ultrasonic power of 40 kHz. The present disclosure makes it possible to ensure an excellent enzyme activity of the natural attapulgite by controlling the conditions of the grinding treatment and the ultrasonic treatment.

In the present disclosure, the natural attapulgite has peroxidase-like activity, catalase-like activity or superoxide-dismutase like activity.

In some embodiments of the present disclosure, under the condition that the natural attapulgite has peroxidase-like activity, the natural attapulgite is used for enzyme catalysis by a process comprising: mixing the natural attapulgite dispersion, a hydrogen peroxide solution, a substrate solution and a buffer solution, and subjecting the resulting mixture to the enzyme catalysis. In some embodiments of the present disclosure, hydrogen peroxide is used as an electron acceptor, which facilitates the oxidation of the substrate. In some embodiments of the present disclosure, the buffer solution is HAc—NaAc or PB buffer solution, and preferably has a pH value of 2-10, and more preferably 3-7. In some embodiments, the present disclosure is to adjust the specific pH value of the buffer solution according to different enzyme catalytic reactions. In the present disclosure, there is no special limitation on the concentrations of the hydrogen peroxide solution and the substrate solution, and they may be adjusted according to the specific enzyme activity reaction.

In the embodiments of the present disclosure, the process for studying the peroxidase-like activity of the natural attapulgite comprises the following two methods:

The first method comprises the steps of: adding 50 μL of a TMB solution (dissolved in DMSO, 10 mg/mL) into 0.9 mL of a PB buffer solution (0.2M, pH 3.6), and pouring into a transparent vial, then adding 100 μL of $H_2O_2$ (30%

(wt/vol)) and 50 μL of the natural attapulgite dispersion (1 mg/mL) thereto in sequence; then replacing TMB with DAB (3,3'-diaminobenzidine tetrahydrochloride) or OPD (o-phenylenediamine) respectively, repeating the above steps, and observing the color change of the reagents. In the first method, hydrogen peroxide is used as an electron acceptor, and the natural attapulgite catalyzes the oxidation of the substrate (DAB, OPD or TMB) to undergo a color reaction.

In the present disclosure, the first method is to realize the qualitative analysis of the enzyme activity of the natural attapulgite by observing the results of the color reaction.

The second method comprises the steps of: adding 200 μL of $H_2O_2$ (30% (wt/vol)), 100 μL of TMB (3,3,5,5-tetramethylbenzidine) and 100 μL of the natural attapulgite dispersion (1 mg/mL) into 1.8 mL of a Hac—NaAc buffer solution (pH=3.6) with a concentration of 0.1 M, in which TMB is used as a substrate to show the color reaction of the peroxidase activity, and then recording the absorbance (for TMB at 652 nm) of the color reaction by Lambda 650S UV-Vis spectrophotometer within a certain reaction time to study the peroxidase-like activity of the natural attapulgite. In the second method, hydrogen peroxide is used as an electron acceptor, and the natural attapulgite catalyzes the oxidation of the substrate TMB.

In the present disclosure, the second method is to verify that the natural attapulgite has peroxidase-like enzyme activity, and realize the quantitative analysis by calculating its absorbance value. In some specific embodiments, the catalytic speed of the natural attapulgite may be reflected by calculating the slope of the linear curve formed by the absorbance and time of the natural attapulgite.

In some embodiments of the present disclosure, under the condition that the natural attapulgite has catalase-like activity, the process for studying the catalase activity of the natural attapulgite comprises the steps of: measuring the oxygen concentration with an oxygen electrode on a portable dissolved oxygen device (HQ30d-hach), and measuring the catalase activity of the natural attapulgite at room temperature; adding 0.4 mL of the natural attapulgite dispersion (2.5 mg/mL) into 5.0 mL of a buffer solution (0.1 M PB buffer solution, pH=7.0), then adding 100 μL of a $H_2O_2$ solution (30% (wt/vol)) thereto, and measuring the solubility (unit: mg/L) of $O_2$ produced at different reaction time.

In some embodiments of the present disclosure, under the condition that the natural attapulgite has superoxide dismutase-like activity, the natural attapulgite is used for enzyme catalysis performed in accordance with a method of SOD kit. In the embodiments of the present disclosure, the superoxide dismutase activity of the natural attapulgite is measured at room temperature in accordance with the instruction of a SOD determination kit, and the superoxide dismutase-like activity of the natural attapulgite with a concentration of 5 mg/mL is expressed as the inhibition percentage of WST response to superoxide, wherein the WST is the material used in the SOD determination kit.

The technical solutions of the present disclosure will be clearly and completely described below with reference to the examples. It is obvious that the described examples are only part of the examples of the present disclosure, not all of them. Other examples made by those skilled in the art without any creative effort should fall within the scope of the present disclosure.

Pre-Treatment

The natural attapulgite was ground for 180 min (with a rotational speed of 50 r/min), obtaining a powder. The powder was mixed with water and the resulting mixture was subjected to an ultrasonic treatment for 180 min (with an ultrasonic power of 40 kHz), obtaining the natural attapulgite dispersion. The concentration of the natural attapulgite dispersion was 1-5 mg/mL, which was 1 mg/mL, 2.5 mg/mL and 5 mg/mL, respectively.

Performance Test

1) Characterizations of Morphology and Structure of the Natural Attapulgite

The natural attapulgite dispersion of Example 1 was tested by JSM-7500F cold-field emission scanning electron microscope and transmission electron microscope (JEOL, model JEM-1400). The results are shown in FIG. 1, in which (a) shows the transmission electron microscope image, and (b) shows the scanning electron microscope image. It can be seen from FIG. 1 that the natural attapulgite has a regular rod-shaped structure. Generally speaking, the attapulgite is in a dispersed state, and consisted of many small bundles with different diameters of 10-50 nm and different lengths of about several hundred nanometers, and many impurities are adsorbed on the surface of the attapulgite.

2) Biocompatibility Test of the Natural Attapulgite

The reagent was a cck-8 kit purchased from Sigma-Aldrich.

The method was performed in accordance with the instruction of the cck-8 kit.

Figure 2:
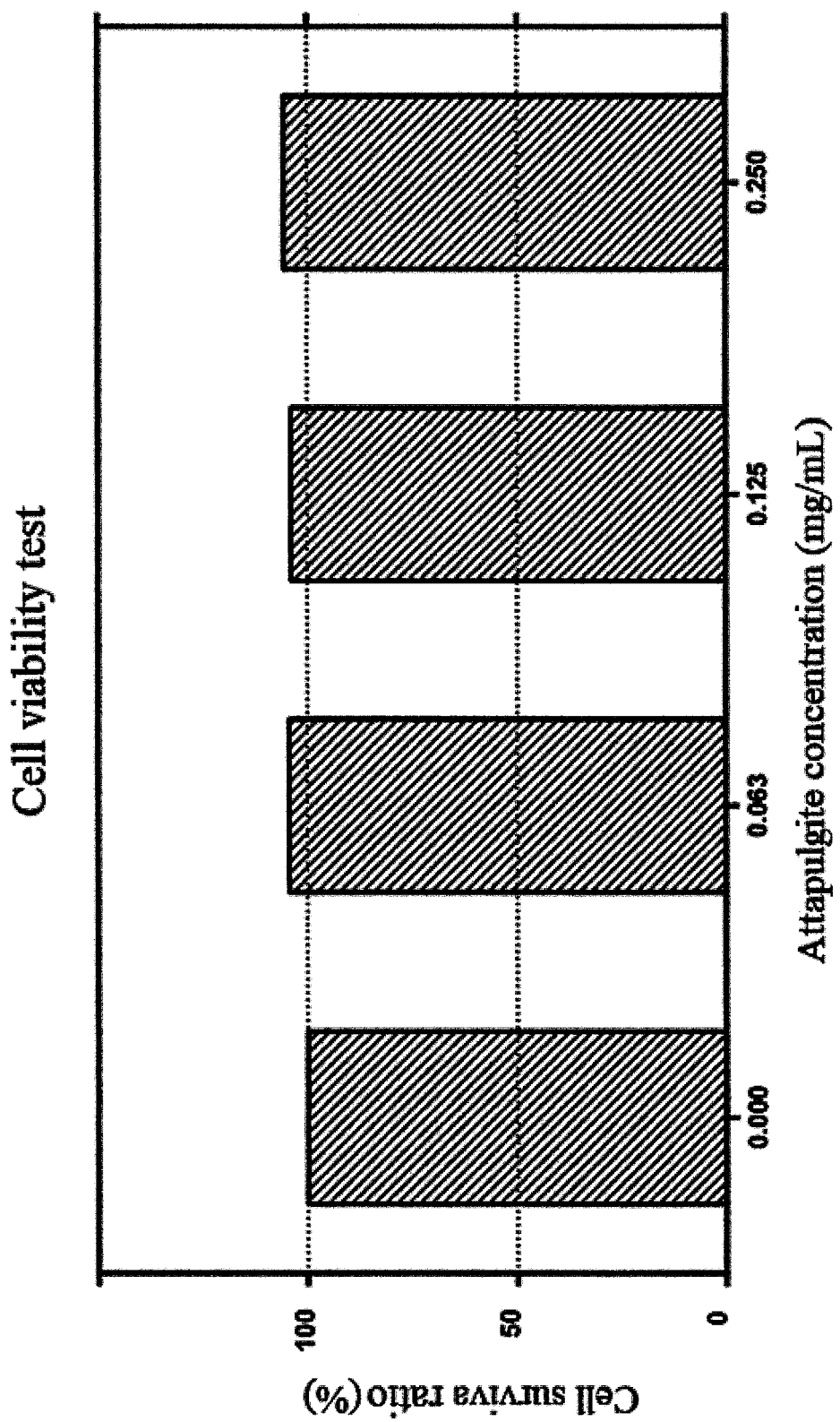
FIG. 2 shows the cell viability test data of the natural attapulgite at different concentrations.

It can be seen from the results that the natural attapulgite has good biocompatibility, and it does not kill HepG2 cells at the concentration of 250 mg/μL (as shown in FIG. 2). Therefore, the biomedical materials based on the good biocompatibility of the natural attapulgite have great development potential.

EXAMPLE 1

The qualitative test of the peroxidase-like catalytic activity of the natural attapulgite:

The reagents were 3,3,5,5-tetramethylbenzidine (TMB), which was purchased from Sigma-Aldrich Inc. (USA), and 3,3'-diaminobenzidine tetrahydrochloride (DAB) and o-phenylenediamine (OPD), both of which were purchased from Sinopharm Chemical Reagent Co., Ltd., China.

The method was performed as follows: 50 μL of TMB solution (10 mg/mL in DMSO) was added into 0.9 mL of a 0.2 M PB buffer solution (pH=3.6), and the mixture was placed in a transparent vial, and 100 μL of $H_2O_2$ (30% (wt/vol)) and 50 μL of the natural attapulgite dispersion (1 mg/mL) were added thereto in sequence; then DAB or OPD was used to replace TMB respectively, and the above steps were repeated.

Figure 3:
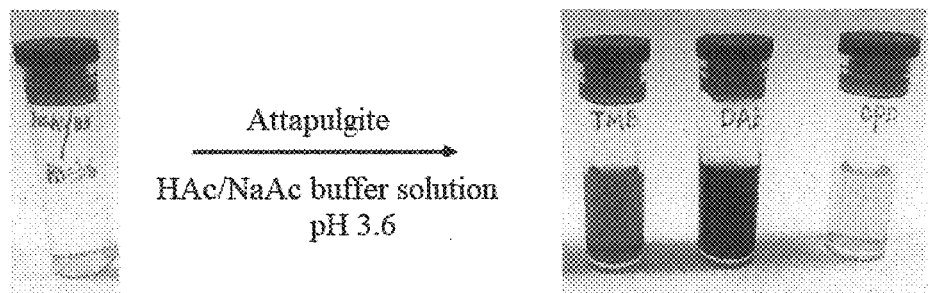
FIG. 3 shows the color reaction results of TMB, DAB and OPD in Example 1.

It can be seen from the results that after five minutes, the color change of reagents as shown in FIG. 3 could be observed. This proves that the natural attapulgite has peroxidase-like activity and could catalyze different substrates catalyzed by existing peroxidases (such as horseradish peroxidase) for color development.

EXAMPLE 2

The qualitative test of the peroxidase-like catalytic activity of the natural attapulgite:

The reagents were 3,3,5,5-tetramethylbenzidine (TMB), which was purchased from Sigma-Aldrich Inc. (USA), and 30% (wt/vol) $H_2O_2$ and sodium acetate, both of which were purchased from Beijing Chemical Reagent Company, China.

The method was performed as follows: 200 μL of $H_2O_2$ (30% (wt/vol)), 100 μL of TMB and 100 μL of the natural attapulgite dispersion (with a concentration of 1 mg/mL) were added into 1.8 mL of a HAc—NaAc buffer solution (pH=3.6) with a concentration of 0.1 M, wherein TMB was used as a substrate to show the color reaction of peroxidase activity. Then the absorbance of the color reaction (for TMB at 652 nm) was recorded by Lambda 650S UV-Vis spectrophotometer within a certain reaction time to express the peroxidase-like activity of the natural attapulgite.

Figure 4:
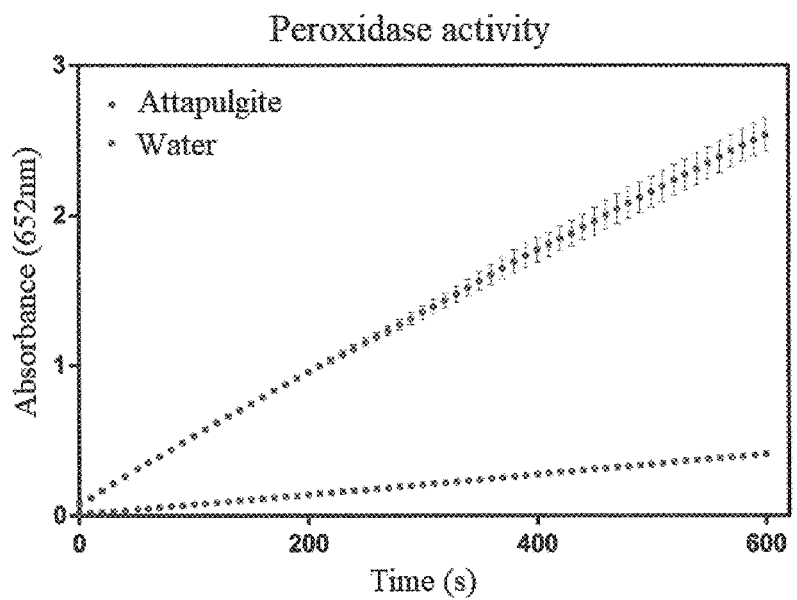
FIG. 4 shows the comparison diagram of peroxidase-like activity of the natural attapulgite and water in Example 2.

It can be seen from the results that FIG. 4 shows the comparison diagram of the peroxidase-like activity of TMB catalyzed by the natural attapulgite and the control group (water) in the presence of $H_2O_2$. It can be seen from the figure that the slope of catalytic kinetic curve of the natural attapulgite in this system is 7.41 times that of the control group ($H_2O$).

EXAMPLE 3

The catalase-like catalytic activity of the natural attapulgite:

The reagents were 30% (wt/vol) $H_2O_2$ and sodium acetate, both of which were purchased from Beijing Chemical Reagent Company, China.

The method was performed as follows: 0.4 ml of the natural attapulgite dispersion (with a concentration of 2.5 mg/mL) was added into 5.1 mL of a buffer solution (0.1 M PB buffer, pH=7.0) containing 100 μL of a 30% (wt/vol) $H_2O_2$ solution, and the oxygen concentration in the system was measured by an oxygen electrode on a portable dissolved oxygen device (HQ30d-hach).

Figure 5:
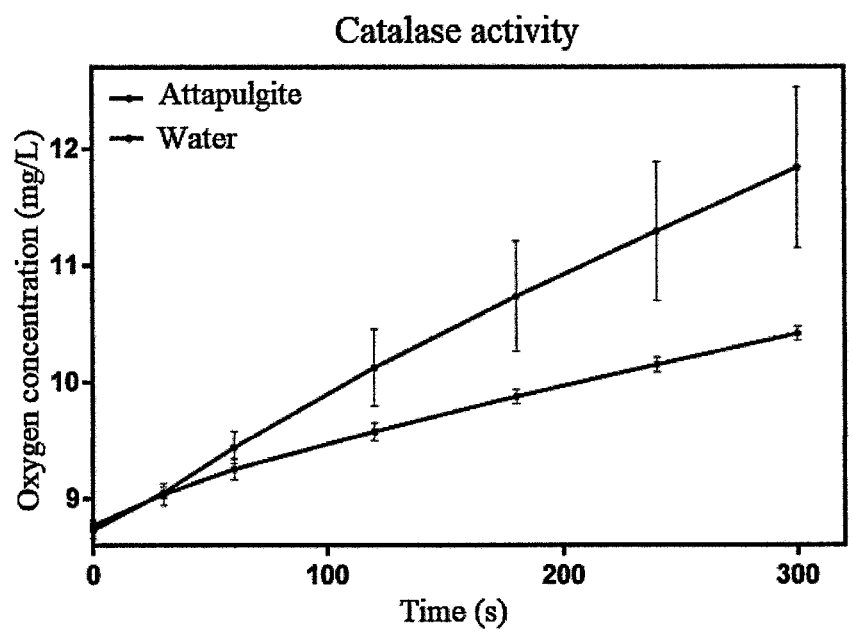
FIG. 5 shows the comparison diagram of catalase-like activity of the natural attapulgite and water in Example 3.

It can be seen from the results that FIG. 5 shows the comparison diagram of the catalase-like activity of the natural attapulgite and the control group (water) catalyzing $H_2O_2$ to produce oxygen. It can be seen from the figure that in this system, the natural attapulgite could catalyze the decomposition of $H_2O_2$ into $H_2O$ and $O_2$, and it could lead to the increase of $O_2$ concentration in the system compared with control group ($H_2O$).

EXAMPLE 4

The superoxide dismutase-like catalytic activity of the natural attapulgite:

The reagents were a SOD kit, which was purchased from Amresco.

The method was performed as follows: the superoxide dismutase activity was determined by the natural attapulgite with a concentration of 5 mg/mL in accordance with the instruction of the SOD kit manufacturer, and its activity was expressed as the inhibition percentage of the natural attapulgite to WST response.

Figure 6:
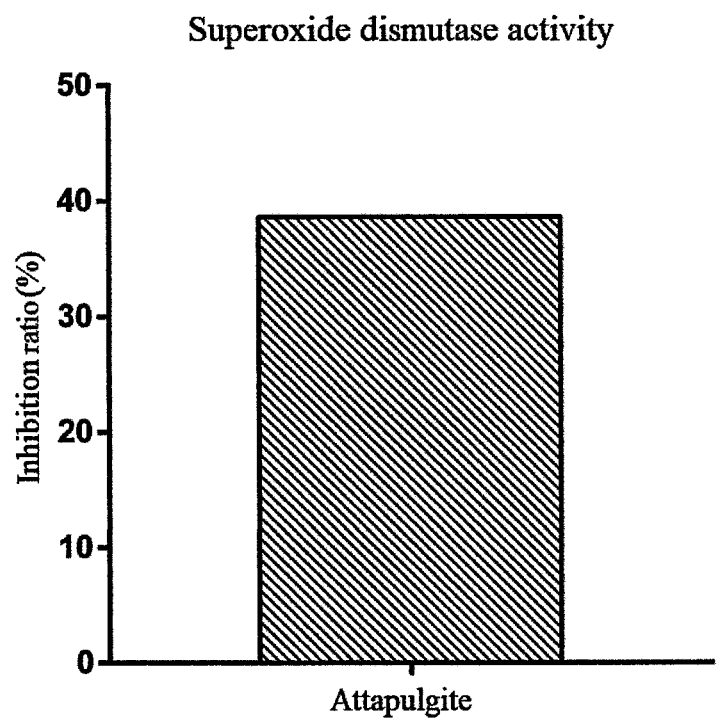
FIG. 6 shows the comparison diagram of superoxide dismutase-like activity of the natural attapulgite in Example 4.

It can be seen from the results that superoxide dismutase could reduce the amount of superoxide free radical ($O_2^-$), which is more active than $H_2O_2$. FIG. 6 shows the diagram of superoxide dismutase activity of the natural attapulgite. It can be seen from FIG. 6 that the natural attapulgite exhibits a certain superoxide dismutase activity. Superoxide is a strong oxide in the human body, and the enzyme content of the superoxide is very low in the human body. It can be seen from the example that the natural attapulgite could be used to remove superoxide in vivo by the virtues such as natural non-toxic, large reserves and easy to obtain thereof.

It can be seen from the above examples that the present disclosure provides use of a natural attapulgite as a natural inorganic enzyme in the field of enzyme catalysis, and the natural attapulgite has enzyme activity. The results of the examples show that the natural attapulgite has peroxidase activity, catalase activity and superoxide dismutase activity, and good biocompatibility.

The above description is merely preferred embodiments of the present disclosure, and it should be pointed out that, for those skilled in the art, several improvements and modifications could be made without departing from the principle of the present disclosure, and these improvements and modifications should also be regarded as the protection scope of the present disclosure.

What is claimed is:

1. A method for using a natural attapulgite comprising:
    mixing a natural attapulgite dispersion, an $H_2O_2$ solution, a substrate solution and a buffer solution to obtain a mixture, and subjecting the mixture to enzyme catalysis; wherein
    the natural attapulgite dispersion consists of the natural attapulgite and water, and the natural attapulgite dispersion has a concentration of the natural attapulgite of 1-5 mg/mL; and
    the natural attapulgite is a one-dimensional fibrous hydrated magnesium aluminosilicate clay mineral.

2. The method of claim 1, wherein the buffer solution is HAc-NaAc or a phosphate buffer solution, and has a pH value of 2-10.

3. The method of claim 1, wherein the $H_2O_2$ solution has a mass concentration of 30%.

4. The method of claim 1, wherein the buffer solution has a concentration of 0.1 M and a pH value of 7.0.

5. A method for using a natural attapulgite comprising:
    adding 0.4 mL of a natural attapulgite dispersion with a concentration of 2.5 mg/mL into 5.0 mL of a buffer solution, and adding 100 μL of an $H_2O_2$ solution thereto, and measuring a solubility of $O_2$ produced at different reaction time; wherein
    the natural attapulgite dispersion consists of the natural attapulgite and water; and
    the natural attapulgite is a one-dimensional fibrous hydrated magnesium aluminosilicate clay mineral.

* * * * *